(12) United States Patent
Rugel

(10) Patent No.: US 8,235,084 B2
(45) Date of Patent: Aug. 7, 2012

(54) DEVICE FOR TRUING AND REGULATING THE TENSION OF SPOKED RUNNING WHEELS

(76) Inventor: Christoph Rugel, Buchenbach (DE)

( * ) Notice: Subject to any disclaimer, the term of this patent is extended or adjusted under 35 U.S.C. 154(b) by 35 days.

(21) Appl. No.: 11/912,467

(22) PCT Filed: Apr. 24, 2006

(86) PCT No.: PCT/DE2006/000718
§ 371 (c)(1),
(2), (4) Date: May 20, 2008

(87) PCT Pub. No.: WO2006/114087
PCT Pub. Date: Nov. 2, 2006

(65) Prior Publication Data
US 2009/0020231 A1    Jan. 22, 2009

(30) Foreign Application Priority Data
Apr. 24, 2005 (DE) .......................... 10 2005 019 120

(51) Int. Cl.
*B60B 31/02* (2006.01)
*G01B 11/26* (2006.01)
(52) U.S. Cl. ........................ 157/1.55; 33/203.12; 157/14
(58) Field of Classification Search .................... 157/3.5, 157/3.55, 1.5, 1.55, 14; 33/203, 203.12, 33/203.18, 203.19
See application file for complete search history.

(56) References Cited

U.S. PATENT DOCUMENTS

| | | | | |
|---|---|---|---|---|
| 563,944 A * | 7/1896 | Thiem | ......................... | 33/203.16 |
| 634,175 A * | 10/1899 | Levin | .............................. | 81/339 |
| 2,525,253 A | 10/1950 | Accola | | |
| 2,601,120 A | 6/1952 | Lyman | | |
| 3,507,027 A * | 4/1970 | Jaulmes | ...................... | 29/894.33 |
| 3,841,379 A * | 10/1974 | Kinney | ......................... | 157/1.5 |
| 4,418,738 A * | 12/1983 | Kaufeldt | ...................... | 157/1.55 |
| 5,459,930 A * | 10/1995 | Crisick | ........................... | 33/203 |

FOREIGN PATENT DOCUMENTS
EP    1188583    3/2002
FR    1009704    6/1952

* cited by examiner

*Primary Examiner* — Hadi Shakeri
(74) *Attorney, Agent, or Firm* — Butzel Long

(57) ABSTRACT

A device for truing and regulating the tension of spoked running wheels includes a support device for stationarily clamping the hub of the running wheel, a measuring device for determining the lateral and top eccentricity of the rim, a device for fixing a motor-driven nipple wrench to the spoke nipple, a device for manually adjusting spoke tension. The hub of the running wheel is clamped for measuring symmetrical to the axial radial plane; both lateral and top eccentricity and rim anomalies on the same radial rim segment can be read out directly and electronically with or without the tires fitted. A wrench can be installed in existing devices; and is suitable for manual and motor-driven applications.

23 Claims, 10 Drawing Sheets

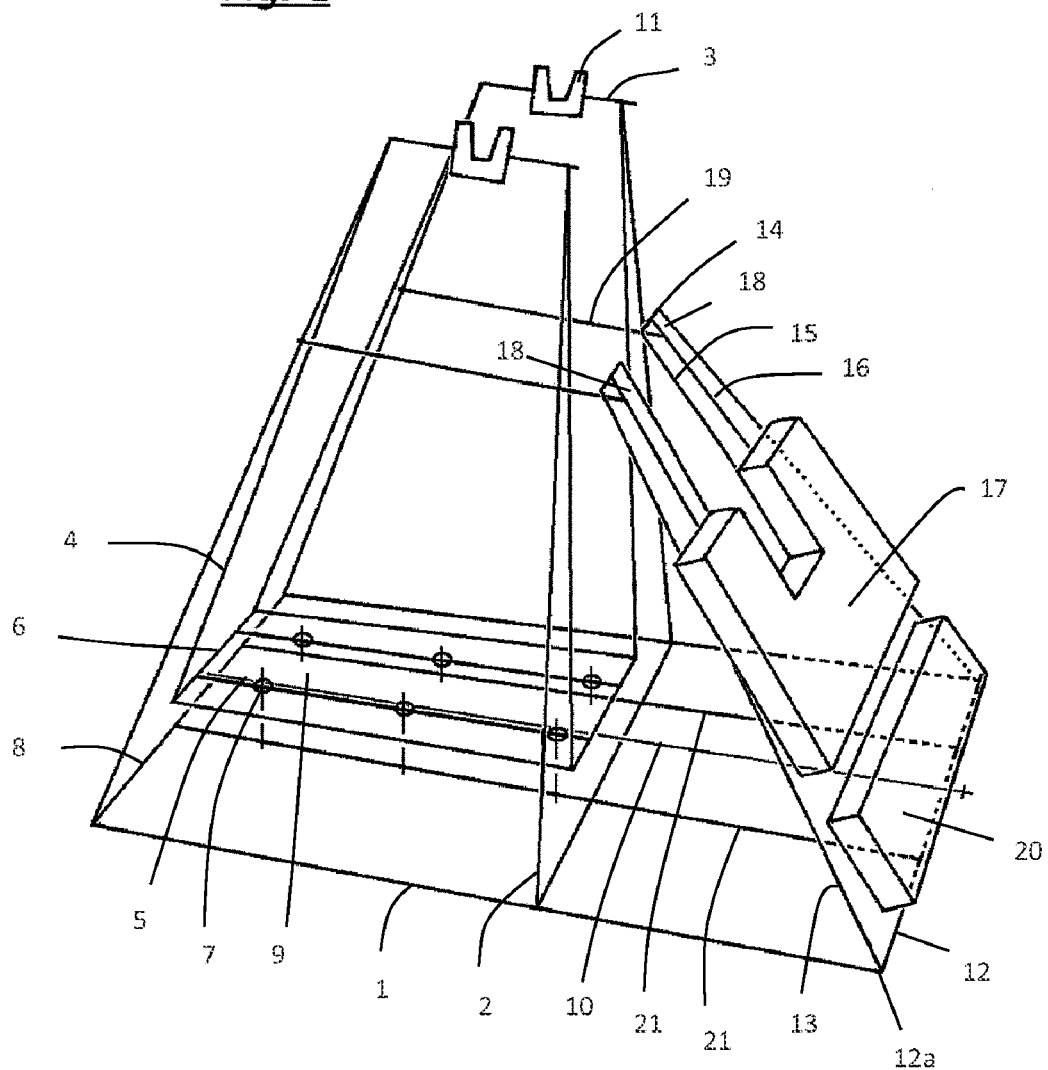

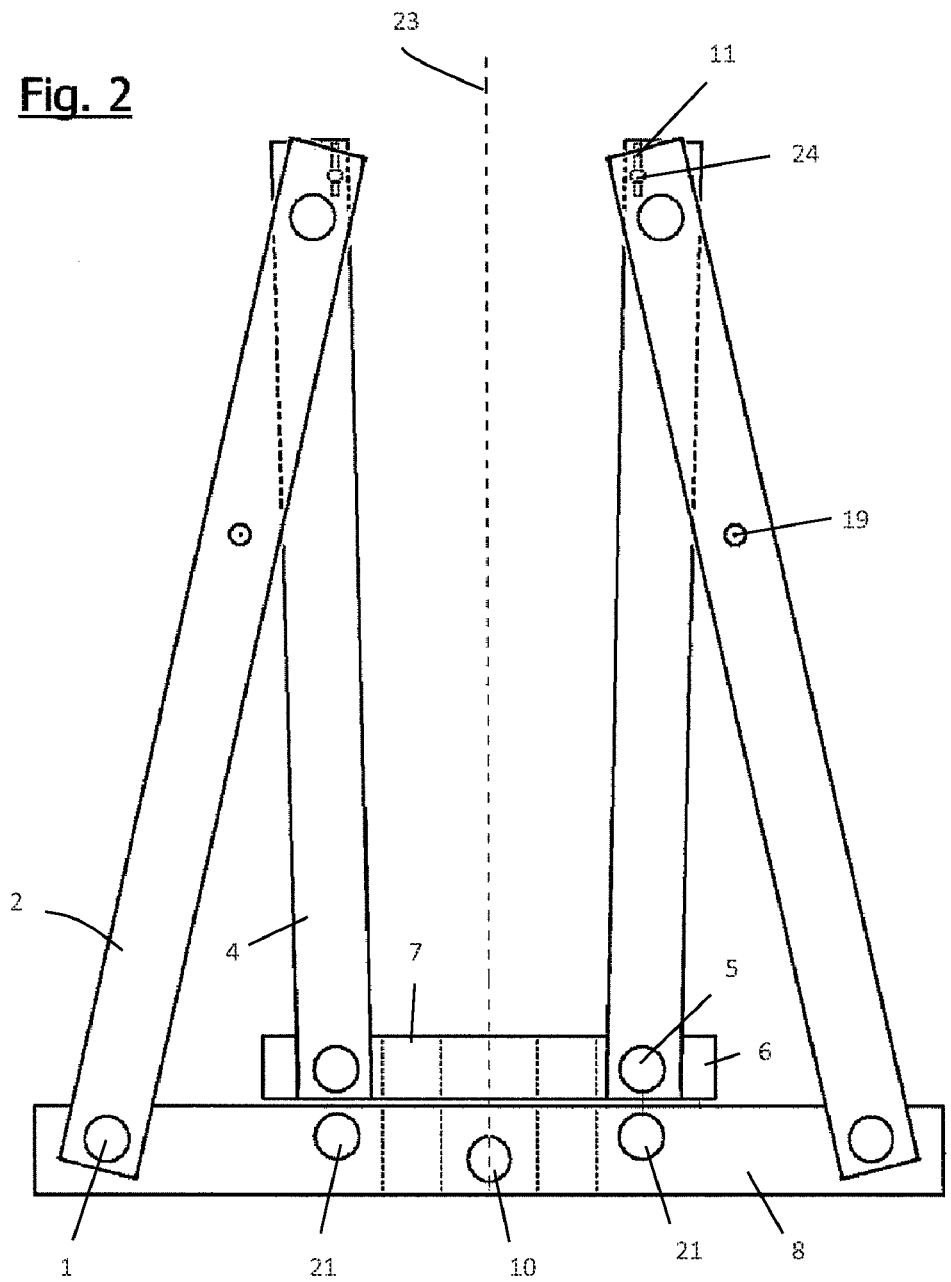

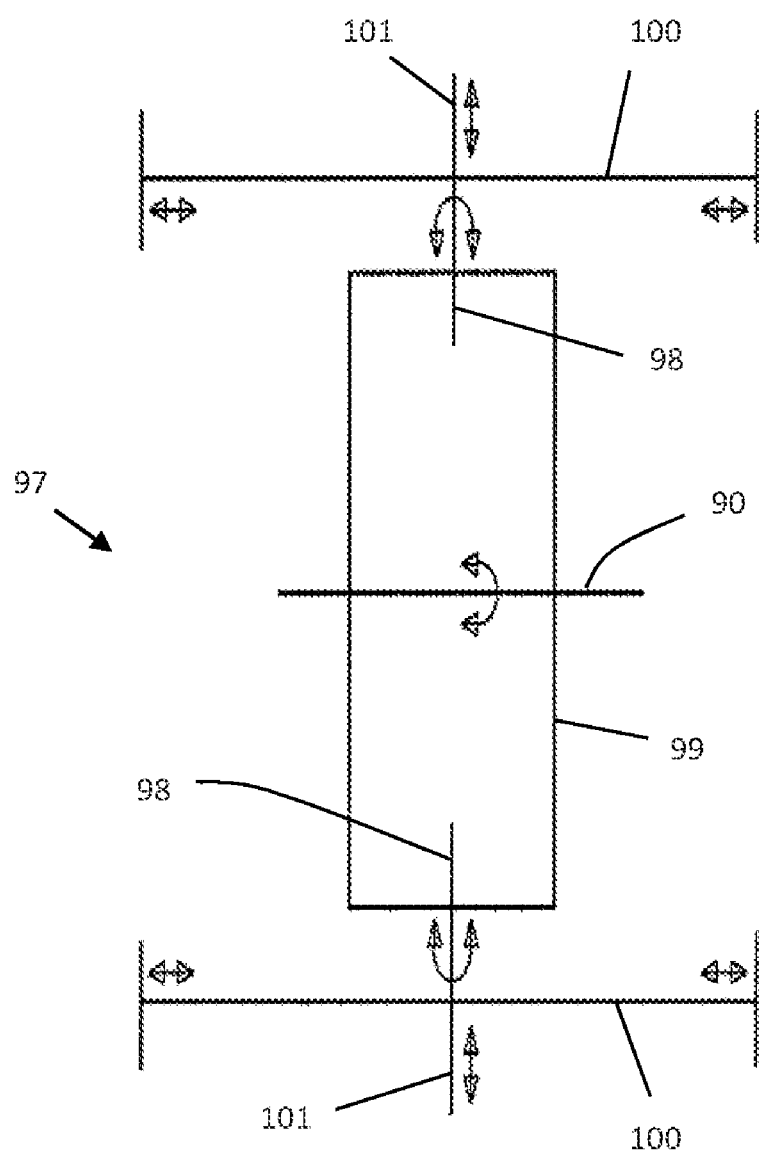

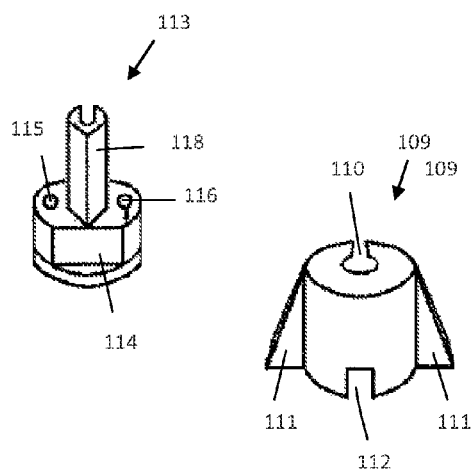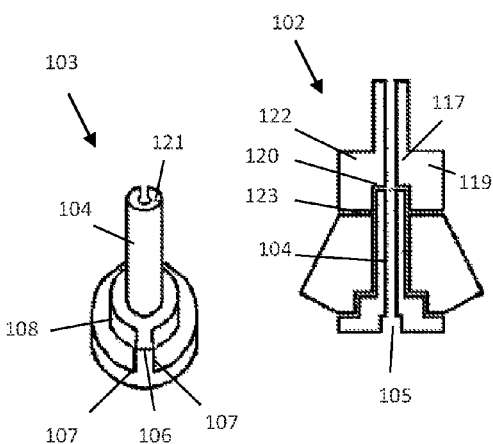
Fig. 5a  Fig. 5b  Fig. 5c  Fig. 5d

DEVICE FOR TRUING AND REGULATING THE TENSION OF SPOKED RUNNING WHEELS

BACKGROUND OF THE INVENTION

1. Field of the Invention

This invention relates to spoked running wheels, and more specifically to a device for truing and regulating the tension of spoked running wheels.

2. Description of the Related Art

Devices that rigidly clamp the running wheel centered relative to its truly axial radial plane are known. With these devices, measurements on the same radial rim segment are possible, but adjustments to the running wheel centered to the running wheel radial axis are complicated. At the same time, there is no device for fixing the lateral and vertical tracing pin on a corresponding rim segment in the running wheel radial direction. Further, existing devices have large tolerances for centering the running wheel relative to its radial center plane. Thus, there is a need in the art for a modular apparatus that centers and adjusts a running wheel using both sides of the rim.

SUMMARY OF THE INVENTION

A support device is provided that clamps the running wheel centered to its radial center plane, and simultaneously indicates the axial deviations of both sides of the rim relative to this radial center plane, and measures the radial runout axially on the same radial rim segment. The running wheel is clamped by a pulling-tilting movement of two supports simultaneously centered relative to the running wheel axis center plane. A measurement device guided by the running wheel supports is simultaneously adjusted relative to a radial rim segment for each rim size.

The support device is modular, and fully automatic.

A measurement device is provided that advantageously measures different running wheel sizes, and displays the measurement values at a predetermined ratio, provides a measurement scale, and is designed for running wheels with and without mounted tires. Another advantage of the measurement device is that it has a simple economical construction as well as low weight. A further advantage of the measurement device is that it includes a simultaneously readable scale field for axial and radial runout and a quick-positioning device for the measurement tracing pin, and provides for electronic measurement value detection and evaluation using motor-controlled, no-contact measurements.

Still another advantage of the measurement device is that radial measurement tracing pins move parallel to the running wheel radial plane, to allow the simple fixing and detaching of the measurement tracing pins to and from the relevant running wheel rim in interaction with a quick-tensioning device for the measurement tracing pins. A further advantage of the measurement device is that the simultaneous display of both rim sides provides for a distinction between rim defects and rim runout.

Still another advantage is for side-grooved running wheel rims, the measurement tracing pins for axial runout can be fitted in the grooves. Likewise, for a detached fixing device of the measurement body, radial deviations of the rim can be detected and displayed simultaneously by means of the lateral tracing pins.

Another advantage of the measurement device is that electronic distance sensors can be attached to the measurement tracing pins, that are in communication with an interactive display. The measurement device can also be connected to an opto-electronic device for counting the spokes for a hand-driven or motor-driven running wheel, to provide electronic assignment of the measurement values to the measurement locations. The manually operated centering computer installed advantageously delivers simultaneously axially centered and axis-radial measurement values within a simple, space-saving, mobile, and modular construction.

In another example of the modularity, a fully automatically operating centering device can be used with a rigidly clamped running wheel. In this embodiment, the measurement body is replaced by a measurement body of the same size. This replacement body works with no-contact, opto-electronically flat beam emitters or flat beam sensors, which are equally suitable for running wheels with and without tires and which are arranged symmetric to the running wheel radial center plane, and can be moved automatically into the optimum measurement position driven by motors on guides attached to the measurement body support. A motor-driven drive roller fixed to the centering device drives the clamped running wheel via the rim bottom side or tire bottom side. Motor-driven nipple wrenches on the centering body are installed in the set-up devices of the two running wheel supports and all three components also connect to the microcontroller. Manual activities during the centering process are limited to pressing on the running wheel rim.

In still another embodiment, for no-contact measurements of the axial and radial deviations of the running wheel rim, an opto-electronically flat beam device having two flat beam emitters is arranged orthogonally at an angle of 45° symmetric to the running wheel radial plane. The flat beam emitters are arranged so that the flat beam intersects the running wheel radial plane in a common line at a right angle to this plane. The beam sensors are arranged in parallel, symmetric to the running wheel radial center plane, so that the axial deviations of the running wheel rim located within the beam planes can be mapped at a ratio of 1:1. To assign the measured distance of radial or axial runout movements of the rim, the difference between the measured left-side or right-side distance is determined, and a third flat beam running orthogonal to the running wheel radial plane and penetrating the common intersection line of the other flat beam is compared, so that the radial deviations can be uniquely calculated from the measured axial distance. Advantageously, the no-contact measurement with the flat beam precisely and continuously displays axial deviations for measuring used running wheels. Still another advantage is the measurement device adapts to the appropriate rim size or rim condition through parallel shifting along the running wheel radial plane through motor control, and allows the centering device to fully and automatically measure any running wheel size with and without running-wheel tires.

A motor-driven nipple wrench is provided that can be reversibly fixed to the spoke nipple, at least one drive movement is directed towards and away from the running wheel radial plane.

Advantageously direct measurement of the axial tension of the spokes is also possible by means of the motor current or the motor voltage.

The wrench socket includes a sliding guide plane for securing the wrench socket to the spoke nipple. The sliding guide plane includes close, parallel guides that are pushed onto each spoke, to match their tilted position, and form a contact with their connection side parallel to the spoke axis, so that the socket axis of the wrench socket fixed to it coincides with the nipple axis. An advantage of the wrench socket is that it is positioned above the spoke nipple and pushed onto the nipple in a whole moving along the spoke axis. Because the socket and nipple edges are aligned parallel to each other and the maximum possible twisted position equals 45°, the rotating wrench socket is dropped against the nipple square. By matching both movement speeds to each other together using a motor current or motor voltage, an elastic device for the wrench socket allows gripping of the spoke nipple from above.

The movement for placing the wrench socket onto the spoke nipple can also be sensed using a sensor device, to establish successful nipple contact of the wrench socket and also a rim contact sensor device. The sliding guide device with attached wrench socket is first pushed onto the spokes until reaching the axis-parallel position and then brought into the final screw position through spoke axis-parallel shifting, gripping the spoke nipple with or without a mounted geared-motor unit in various possible reversible movement sequences.

For devices with rigidly attached external motor gear units, for different rim sizes, the torque transfer of the wrench socket fixed to the sliding guide device takes place by means of a flexible shaft. The reversible movement sequences are constructed differently for a translating drive movement and for a rotating drive movement.

For the translating drive movement, the slide-guided wrench socket device is first pushed onto the spoke in a straight line in a fixed, frontal direction relative to the running wheel radial plane. The joint devices for the tilting axes relative to the running wheel radial plane align the slide-guided wrench socket device in a straight-line movement direction parallel to the spoke arrangement. The device moves in a linear direction parallel to the running wheel radial plane, and the deflections are guided laterally to the movement direction during the alignment of the sliding guide along the spoke due to the radial deviations from the axis center of the running wheel radial-parallel tilting axis moved by the sliding guide device. Lateral deflections are also produced during the subsequent lowering process of the slide-guided wrench socket device along the running wheel spoke. When the downwards movement is not directed axis-parallel to the spoke, it is directed perpendicular to the frontal-directed movement direction, such as using one single motor device. In this case, the straight-line forward movement directed frontally to the running wheel radial plane is converted into a spoke axis-parallel downwards-directed movement direction for parallel contact of the slide-guided wrench socket device on the running wheel spoke for placing the wrench socket on the spoke nipple along the spoke by means of suitable joint devices.

For the reversible rotating drive movement, the spoke axis-parallel setting of the sliding-device-guided wrench socket and also the placement on the spoke nipple is realized using a rotating movement. A tilted, motor-driven radial joint can be aligned parallel to the running wheel radial plane approximately at the height of the nipple, and is guided with slide bearings in a linear direction in a plane orthogonal to the running wheel radial plane both parallel and perpendicular to the running wheel radial plane with elastic movement devices. A rod-like holding device is first moved orthogonal to the running wheel radial plane onto the spoke and finally aligned axis-parallel to this spoke. For sliding-device-guided shifting onto the spoke, the tilting movements already generated in the translating movement case and lateral displacements are by the tilting bearing and also the two elastic guided slide bearing devices of the radial axle.

After contacting the spoke, the sliding-device-guided wrench socket is then pushed along the spoke axis onto the spoke nipple by continuing the rotating movement. The radial axle is pushed backward by means of its corresponding linear joint and in this way exerts slight pressure on the running wheel spoke. By lifting the wrench socket from the spoke nipple beginning with the rearward rotational movement, this contact pressure guarantees a tilt-free detachment of the wrench socket in the nipple axis direction. In addition, use of a fine-adjustment device allows the working position of the radial joint to be set relative to the running wheel radial plane. The shifting of the radial joint parallel and perpendicular to the running wheel radial plane can be realized manually, or can be motor driven, such as for adapting to different running wheel sizes.

A device for manual adjustment of the spoke tension is provided that advantageously incorporates nipple tensioning, spoke tensioning, measuring and torsion control, into one device. Another advantage of the present device is that the axial tensile stress of the spoke can be measured.

The manual adjustment device includes a cylindrical base body with nipple wrench socket, spoke guide, and pressure sensors, a center rotating body and also a head unit with power supply, display, signal transmitter, and torsion display. The rotating movement of the wrench socket can be driven by a motor. The controlled drive unit can be used on the spoke in a manually operated way for the motor-driven nipple screw device presented here.

Other features and advantages of the present invention will be readily appreciated, as the same becomes better understood after reading the subsequent description taken in conjunction with the accompanying drawings.

BRIEF DESCRIPTION OF THE DRAWINGS

FIG. 1 is a perspective view illustrating a schematic centering stand support device, according to the present invention;

FIG. 2 is a frontal view of the symmetric tensioning/tilting mechanism of the centering stand support device, according to the present invention;

FIG. 4e is a diagrammatic view illustrating a tilting of the nipple wrench, according to the present invention;

FIGS. 5a-5d illustrate various views of a manual nipple wrench, according to the present invention.

DESCRIPTION OF THE PREFERRED EMBODIMENTS

Figure 3A:
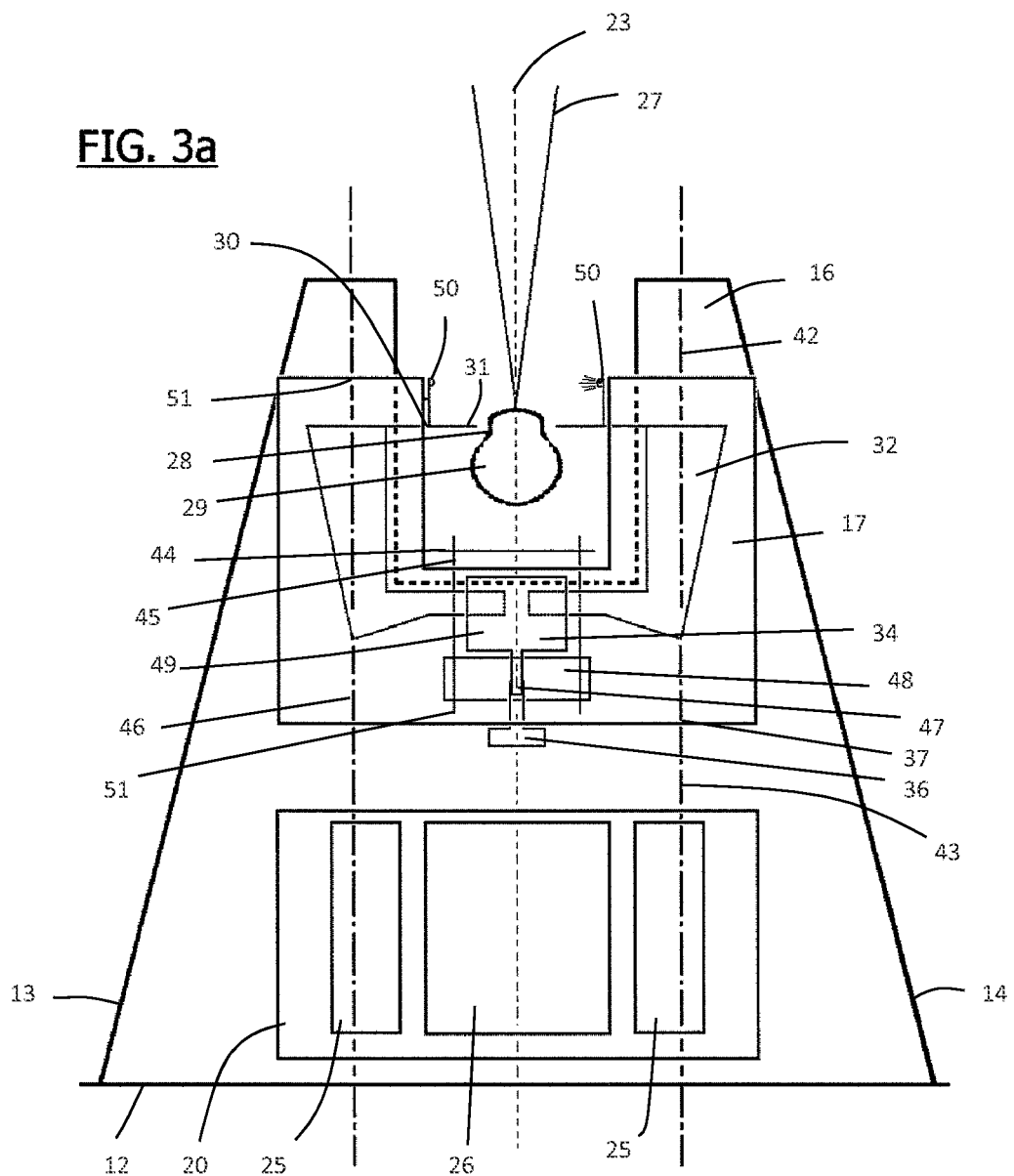
FIG. 3a is a perspective view illustrating a measurement body, according to the present invention.

Referring to FIG. 1, a centering stand includes outer trapezoidal support plates 1, 2, 3, 4, 5, which are arranged symmetric to each other. The support plates 5 and 6 form, via the tube guides 7, a base that is fixed vertically and can move in a rigid body portion 9 between lines 8. The support plates 1, 3, 5 represent sliding guides that move in the radial direction. A rod device 10 is used for lifting and lowering the base 5, 6 within the body portion 9. A holding device is provided that can also move in the radial direction, for the running wheel hub. The centering stand includes a symmetric support plate 12, 13, 14, 15, which is u-shaped in the upper half. The support plate 12 includes sliding guides 16 for receiving the measurement body 17. The sliding guides contact a holding device 19 that is attached to the two outer supports 1, 2, 3 from a radial rotating joint 12*a* running over the entire width of the support construction outwards to two upper points 18 that are symmetric to each other. A control unit with display 20 is attached to the bottom end of the holding support. The outer and inner support plates and also the base of the support construction can be designed with devices for installing the motor-driven nipple wrench.

Referring to FIG. 2, a frontal view of the support device is provided showing a construction of high-precision tubes used to form portions of the support plate defined by lines 1, 3, 5, rod device 10, holding device 19, tubes 21, 22 and also rectangular tubes forming a portion of the support plates defined by lines 2, 4, 6, 8. The tube guides 7 are arranged symmetric to a running wheel axis center plane as shown at 23. The rigid body 9 includes rectangular tubes 8 arranged one behind the other in a plane. The articulated high precision tubes along line 1, the movement rod tube 10, and also the two tubes 21 are arranged symmetric to the axis 23 to contribute to the stability and dimensional accuracy of the centering stand. As shown in FIG. 1, the tubes along line 1, tube 10, and tube 21 and also the tube of holding device 19 form the basis for the dimensionally accurate assembly of the measurement support plates defined by lines 12, 13, 14, 15. The tubes of holding device 19 can be stick-slip tubes. In this example, the holding device 10 for the running wheel hub 11 includes a radial cardan joint 24, which runs above the articulated tube of the support plates along line 3 and which is used as a further holding device 11 connected rigidly to a v-shaped plate for the running wheel axle. It should be appreciated that the stick-slip tubes of holding devices 19 may move on circular lines during the pulling/tilting movement. The measurement body support plates defined by lines 12, 13, 14, 15 are supported to move along the radial joint 12 and form a stick-slip contact at each of its ends. Its two U-flanks are oriented in the axis radial parallel direction to provide an optimum average height of the stick-slip tubes of holding devices 19. Advantageously, higher measurement tracing pins can be utilized to minimize the running-wheel radial directional deviations produced for a minimum to maximum running wheel hub width. The resulting error on the radial rim segment lies within the tracing pin sensor cross sections, and thus a simultaneous, running wheel axis radially directed measurement of the axial and radial runout of the running wheel can be obtained.

Figure 3B:
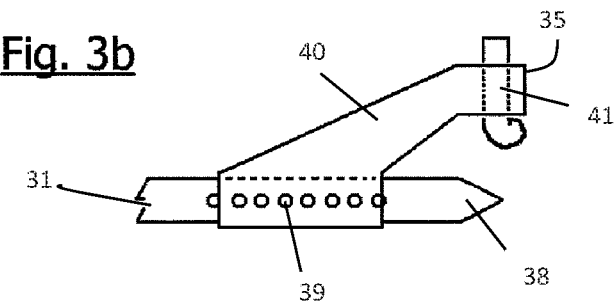
FIG. 3b is a view of the tracing pin for the measurement body, according to the present invention.

Referring to FIGS. 3 *a, b, c*, a measurement body extends from support plates defined by lines 12, 13, 14, 15 forming sliding guides 16 for receiving measurement body 17, a display control unit 20 with the control fields 25 and display 26 are illustrated. The measurement body 17 is slidingly fixed to the sliding guide 16 of the centering stand, so that it can move using a sliding device 50. A spoke 27, a rim side 28, and also a running wheel tire 29 of the running wheel are shown in a centered position relative to the radial wheel axis center plane 23. A tracing pin 31 is movable within a slide bearing 30, having a contact pressure device 35, and guides the display plates 32 rigidly with them. The display plates 32 appear in the scale field 34 and show a gap size that is dependent on the rim width centered relative to the running wheel radial plane 23. The display plates 32 can also simultaneously display the radial runout of the rim in the scale field 34, when the probe tip is guided in the lateral groove of a rim side 28 and the sliding guide brakes 37 are simultaneously released by means of a setting button 36. As a result, the measurement body 17 is guided along with vertical deflections by means of the slide bearing 30, so that these deflections can be displayed in the scale field above the lower edge of the display plates 32. In another example, a sticking contact can be formed on the rim top or bottom side by means of contact pressure devices 42 or 43, using a pivot support 40 that can be locked, such as by using precision boreholes 39 and a similarly rotating tracing pin 41. Advantageously the measurement tracing pin is always carried along in a mutual way and therefore always measures at the same rim position.

In an example the axial and radial runouts may be measured independently of each other. The measurement roller 44 is moved using the slide guides 45. A spring mounted on the running wheel 29 or the rim bottom side using the pressure device 46 displays the radial runout in the scale field 34 simultaneously with the measurement plates 32. Axial runout determined using the measurement plates 48 can be displaced with the setting button 47. A magnifying glass 49 may be fixed above the scale field for increasing the read-out accuracy.

In addition, the measurement body may include electronic distance sensors. Measurement data from the distance sensors can be retrieved on the display 26 using the operating fields 25 of the control unit 20. The electronic distance sensors can be attached between the sliding guides 51 or 30 of the measurement body. An adjustable electro-optical counting device 50, such as a microcontroller unit, may assign unique rim locations to the measurement values and may calculate the necessary processing steps for centering the rim relative to the running wheel center axis. The counting device may be attached to the upper ends of the measurement device.

Figure 3C:
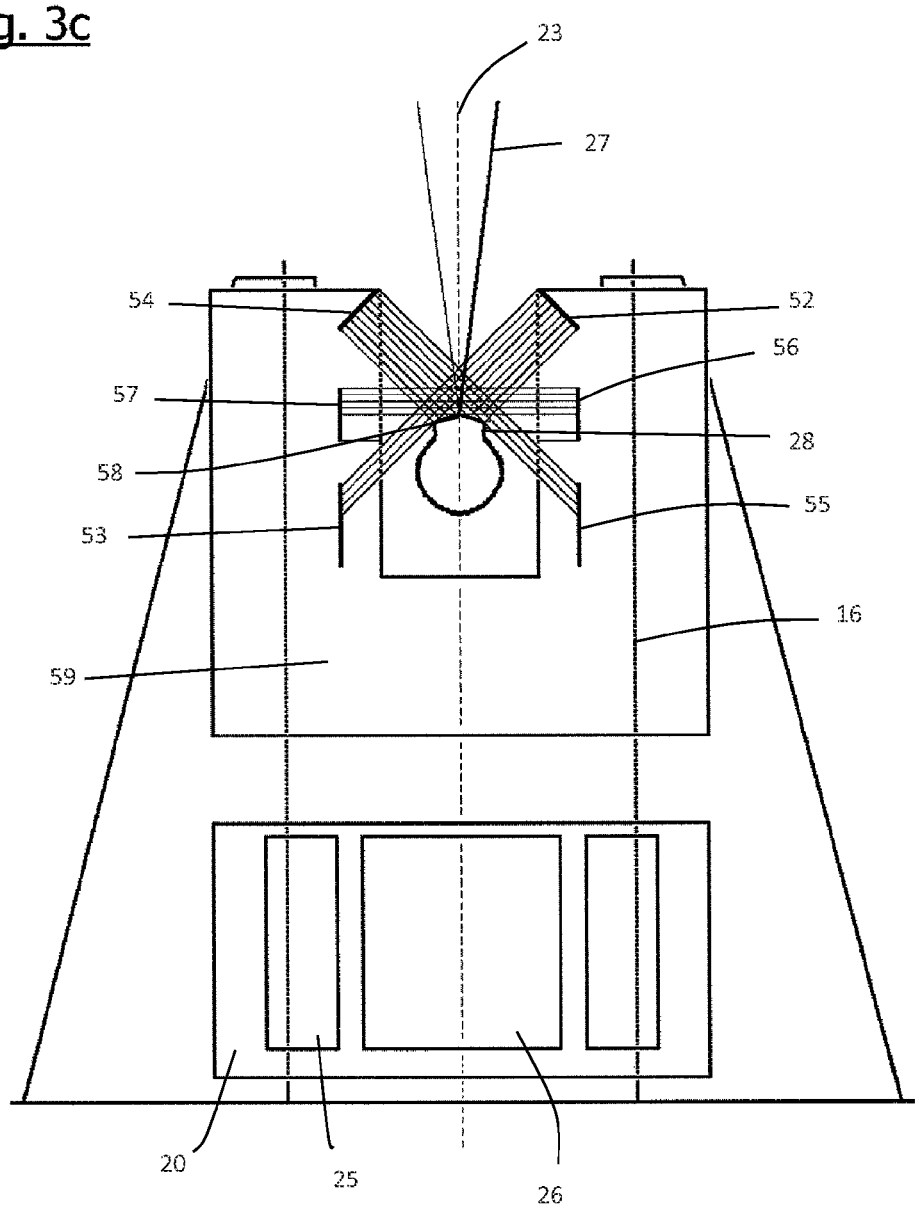
FIG. 3c is an elevational view of another embodiment of a flat beam measurement body, according to the present invention.

Referring to FIG. 3*c*, the measurement body 17 may be removable from the support plates 12, 13, 11, 15, so that a flat beam measurement body 59 with an opto-electronic measurement unit for flat beam measurements can be installed in its position. The flat beam measurement body 59 includes flat beam emitters 52, 54, 56 and corresponding flat beam receivers 53, 55, 57 in communication with a microcontroller, the display 26 and the control device 25 of the control unit 20. The flat beam emitter/receiver pairs 52, 53, 54, 55 are arranged at an angle of 45° orthogonal to the running wheel center axis 23. In contrast, the flat beam emitter/receiver pair 56, 57 is 90" orthogonal to the running wheel center axis 23. The angular position of 15° is preferred, since deviations of the rim orthogonal to the running wheel center axis 23 are mapped 1:1 to the flat beam receivers 53, 55 oriented parallel and orthogonal to the axis 23. The flat beam emitter/receiver pair 56, 57 may detect a feature such as spokes or valves, as well as any radial deviation of the running wheel rim. Thus, a detected deviation of the receiver 53, 55 is determined by comparing the detected deviation with the measurement values stored in the microcontroller. The use of more than one flat beam emitter/receiver pairs 52, 53 or 54, 55 provides for increased operating reliability of the measurement body and minimizes errors. Thus, a completely no-contact measurement of the axial and radial runouts of the running wheel is possible. Automatic adjustment of the measurement body for the appropriate rim size can be achieved by a motor-driven device 73 that moves the flat beam measurement body 59 along the guide devices 16 in coordination with the microcontroller. By using a drive roller for the running wheel that is similarly controlled by the microcontroller, the fully automatic measurement process of the running wheel is provided.

Figure 4A:
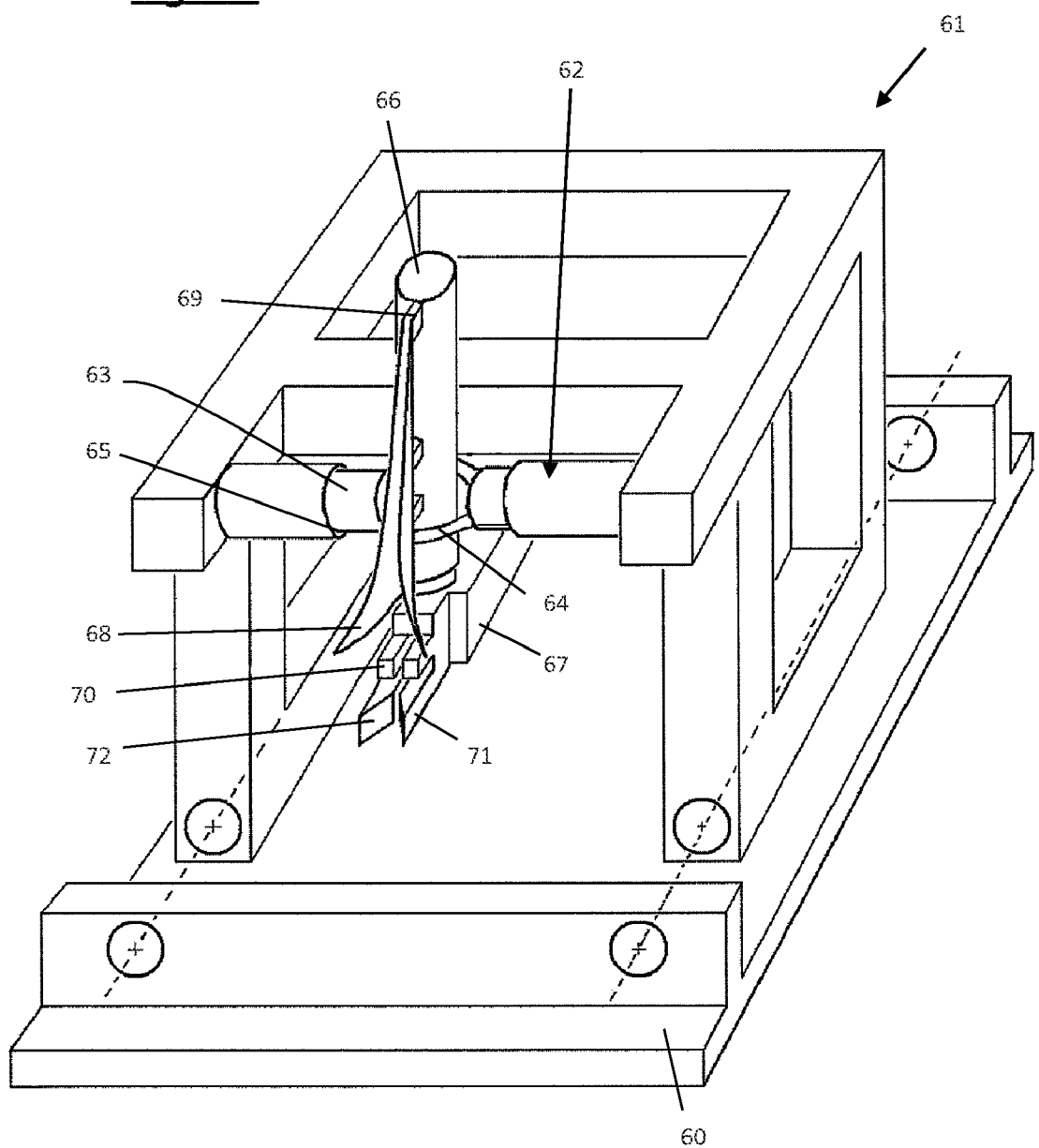
FIG. 4a is a perspective view illustrating a nipple wrench moved with a moving support unit, according to the present invention.
Figure 4B:
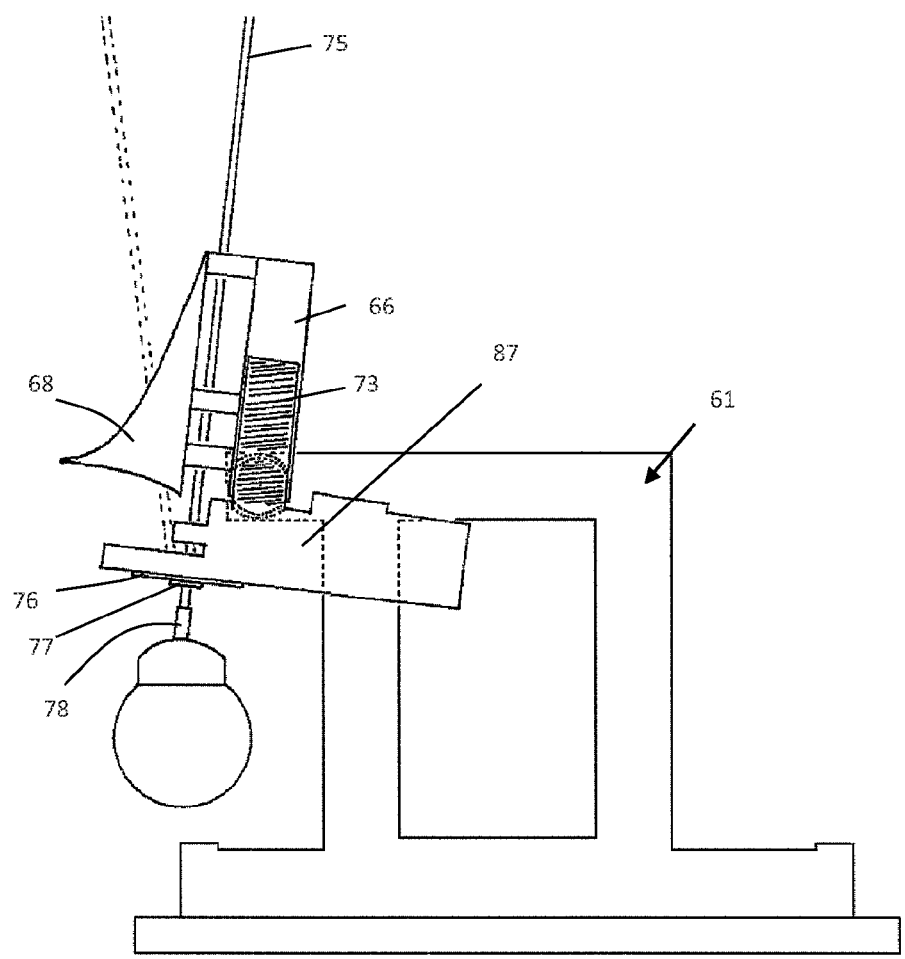
FIG. 4b is an elevational view illustrating translational movement and rotational movement of the nipple wrench, according to the present invention.
Figure 4:
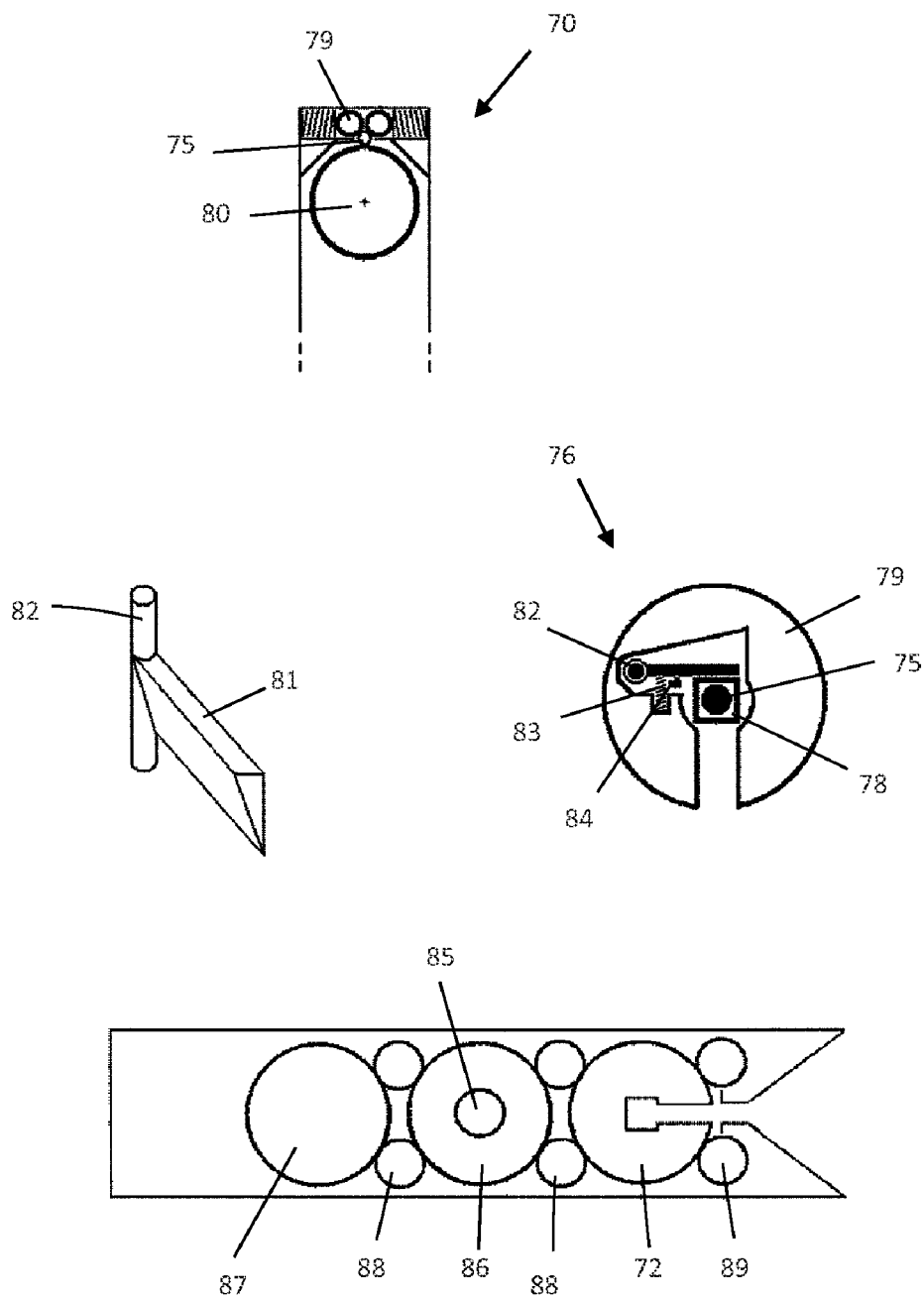
FIGS. 4$c_1$-4$c_4$ are various enlarged views of a torsion measurement device for the nipple wrench, according to the present invention.

Referring to FIGS. 4 a, b, $c_1$-$c_4$, d, e, an example of the motorized screw body with moving support unit is illustrated. The screw body includes a base plate 60 having a support construction 61 moving in the running wheel axial direction towards the running wheel radial plane with the two-sided holding device 62. A cardan joint on the two-sided holding device 62 is oriented by the device 63 moving in the axial and radial directions with holding support 64 and radial joint 65, on which the screw body 67 and also the sliding guide device 68 are rigidly attached above the mounting body 66. For movement of the support construction on the running wheel radial plane towards the appropriate spoke, the screw body 67 adapts with the help of the sliding guide device 68 to the inclined position of the appropriate spoke. A simultaneous tilting of the cardan joint in the running wheel axial plane and orthogonal to this plane contacts the spoke 75, so that a centered position of the wrench socket 72 above the spoke nipple is achieved in its axial direction using holding devices 69, 70, and 71. The holding devices 69 are equipped with a mechanism for sliding, reversible adhesion to the spoke. Another holding device 70 also includes a torsion measurement mechanism for the spoke and thus can be referred to as a measurement device.

As shown in FIG. 4b, the wrench socket 72 can be placed on the spoke nipple 74 through displacements centered relative to the nipple axis longitudinal to the spoke using a drive 73 oriented in the mounting body 66. In this example, the wrench socket turns at slow speed, such as 8 rpm, so that it can slide over the spoke nipple after detection by a nipple position sensor 76. The movement is then stopped using a rim contact sensor 77, and the nipple wrench can change to a screwing process. An angle sensor 87 may be housed in the screw body 67 to directly measure the rotation of the wrench socket calculated in advance by the microcontroller. When removing the spoke nipple, the wrench socket slot is reversibly rotated into the starting position. In the opposite movement direction, the drive 73 lifts the wrench socket from the spoke nipple and the support construction 61 moves back into its starting position.

In FIGS. $4c_1$-$4c_4$, the torsion measurement holding device 70 having a running wheel spoke 75 clamped between two spring-guided balls 79 and an angle transmitter 80 is illustrated. The angle transmitter 80 is pressed against the running wheel spoke 75 to receive the rotating movement of the spoke. In addition, a nipple position sensor 76 is provided having a tracing pin arm 81 installed within the spring-guided balls 79, the radial bearing 82, the restoring spring 83, and also the electrical contact device 84. During the simultaneous lowering and rotating movement of the wrench socket 72, the tracing pin arm 81 tapering downward initially lies on a narrow bottom side on an arbitrary rotationally positioned spoke nipple 78. The tracing pin arm 81 turns with the wrench socket 72 set at a right angle to its contact position, up to the contact position parallel to one of the spoke-nipple square sides. Furthermore, the lower plane of the screw body 67 shows the wrench socket 72, the drive wheel 86 connected to the gear shaft 85, an angle transmitter 87, and also transmission wheels 88 or stabilization wheels 89. It should be appreciated that placement of the nipple wrench on the spoke nipple can be performed within the slide-guided forward movement using additional joint devices. Likewise, the sensor elements for contacting the nipple wrench or for stopping the placement movement may not be required. Similarly, suitable spring devices may be utilized with the control of the wrench socket position using the measured current flow change due to the increased torque when the spoke nipple is seized, due to the slow and precise rotating movement of the nipple wrench. Consequently, using the angle transmitter 87, the spoke tension is determined from a tightening movement of the spoke nipple with a subsequent, opposite loosening movement through the motor current values measured at the same position of the angle transmitter 87. The torque can be determined within the microcontroller unit. The microcontrolled unit may calculate torque using a relationship* for screw connections under tensile stress as follows:

Mt=tangential torque
Fu=circumferential force
Fa=axial tensile force in the threads
$\alpha$=pitch angle of the threads
ρp=angle of friction, each formed with the resultant—from the normal force and the friction force opposite the respective movement—and the normal force
r=flank radius of the threading.

For tightening the spoke nipple, the following applies:

$$Mt\!\uparrow = r^*Fu\!\uparrow = r^*Fa^*\tan(\rho+\alpha) \qquad \text{I:}$$

For loosening the spoke nipple: the following applies:

$$M\!\downarrow = r^*Fu\!\downarrow = r^*Fa^*\tan(\rho-\alpha) \qquad \text{II:}$$

To determine the axial spoke tension force Fa, the second unknown causing an interference, thread friction determined by the angle of friction β, can be solved for β using thread friction acting equally in both measurements. The measurement of Fa in the same nipple position in equation I and II, can be determined using known addition theorems that are simplified and solved for Fa using the relationship $$Fa = Mt\!\uparrow - Mt\!\downarrow/2^*\tan\alpha, \qquad \text{III:}$$

Since potential thread pitches for spoke threads according to DIN 79012 can be programmed into the microcontroller as pre-selected constants, an approximately linear relationship of the torque Mt↑ or Mt↓ measured directly via motor current and/or motor voltage or motor rotational speed is available for measurement evaluation. For further error reduction, repeated measurements are possible. The advantage of spoke tension measurement relative to a tension measurement using an acoustic measurement or by placing a suitable measurement device on the spoke lies both in the prevention of spoke crossing effects and also the selection of the placement point, which is prone to errors, for the tension measurement.

Figure 4D:
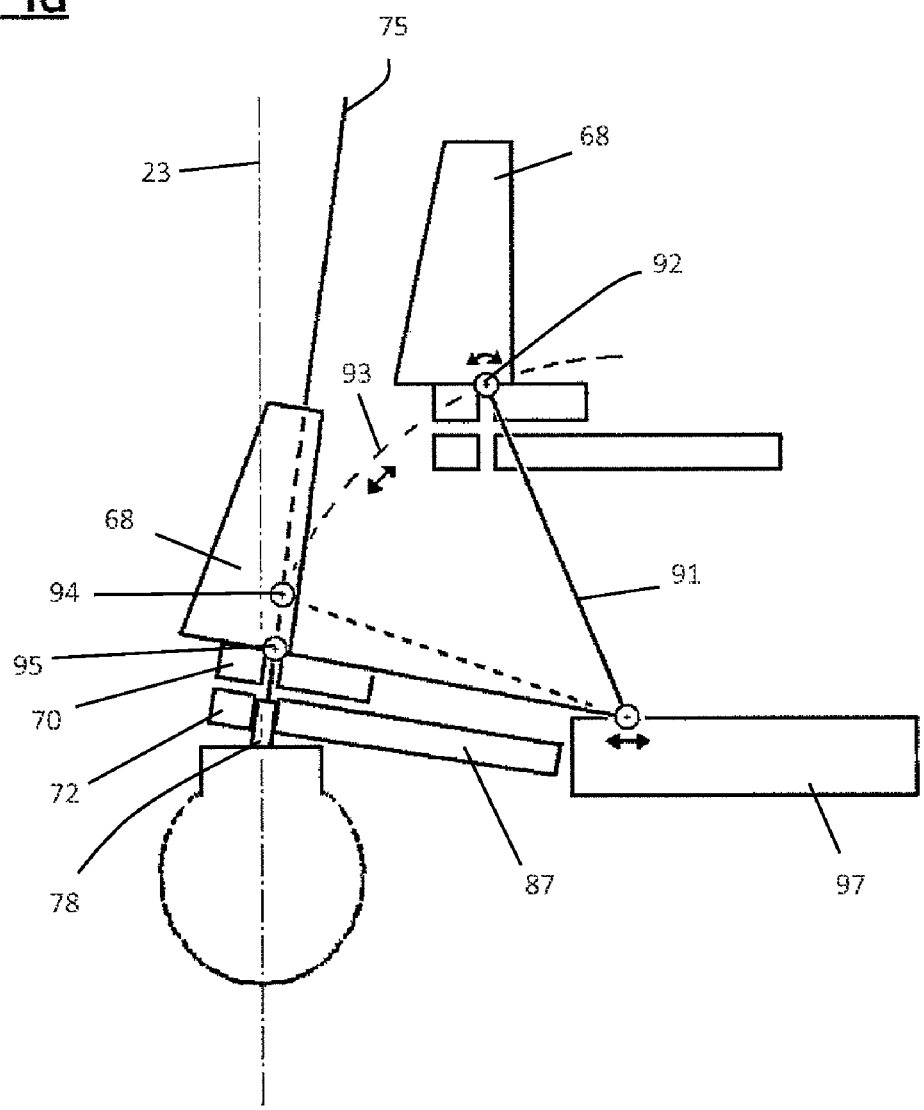
FIG. 4d is a side view illustrating a rotating drive movement of the nipple wrench, according to the present invention.

FIG. 4d shows a side view of the rotating drive movement. Movements in the plane of the paper are shown by arrows. A radial joint 90 is attached to first end of a moving, rod-like holding device 91, and a radial joint 92 is attached to a second end. The holding device 91 simultaneously holds the sliding guide device 68 so that it can move in the radial direction. Furthermore, the rotational path followed by the radial joint 92 through the motor-driven movement via the radial joint 90 is shown at 93. The tilting bearing of the radial joint 90 is shown in FIG. 4e using a support device 99 having linearly displaceable radial bearings 98, which are supported so that they can move by means of the linear guides 101. Furthermore, an adhesion point 94 of the radial joint 92 on the spoke 75 is shown on the rotating track 93. The wrench socket 71 is guided by the sliding-device 68 and contacts the spoke axis parallel for the first time, together with the holding device 69, the wrench socket guide device 72, and also the torsion measurement device 70. The radial joint 92, as shown at 95 with the sliding-device-guided wrench socket sitting on the nipple pushes 96 the tilting joint 90, supported elastically and in a translational way as shown at 97, somewhat away from the running wheel radial plane 23. This allows for the inverse movement, a pulling away of the wrench socket from the nipple in the nipple axis direction along the spoke axis based on the restoring forces generated in 97.

FIGS. 5A-5D illustrate a manual nipple wrench 102. The manual nipple wrench includes a base body 103 having a spoke guiding device 104 with wrench socket 105, a contact web 106, and a two-sided pressure sensor 107 and rotary head guide 108. The manual nipple wrench also includes a rotary head 109 with spoke slots 112, 110, contact pressure flanks 111, and pressure contact slot 112. The manual nipple wrench further includes a cover device 113, having a measurement display 114, signal devices 115, 116, and a spoke adhesion device 117. By bringing the manual nipple wrench 102 in the axial direction against the running wheel spoke, the fixed cover device 113 moves with the base body 103 via an axis radial sliding guide device 104 and contacts the spoke with the spoke adhesion device 117, so that the cover device 113 forms a fixed base relative to rotating movements of the base body 103 by means of the rotary head 109. The manual nipple wrench displays the torsion of the spoke at the wedge-shaped vertical tip 106 when the nipple wrench socket 105 sits on and turns the spoke nipple. For measuring the spoke tension with the nipple wrench 102, the measurement of the torque when tightening or loosening the spoke nipple under tensile stress is required in the same nipple position. The torque is calculated using the force effect measured by pressure sensors arranged radial to the spoke axis. For example a microchip 119 mounted in the cover device 113 determines the force effect using the pressure sensor measurement and the linear relationship $M=F \times r$. The cover device 113 may be installed on its bottom side 120 through a sliding contact 121 of the base body 103 with two point-contact devices arranged at an angular position of ca. +/−75° relative to the spoke slot 110. For optimum measurement results on the measurement contact, the base body is turned with the rotary button past the 75° position by ca. 25°. At these positions there are also point contacts, so that a "green light" for the second measurement and also for an overall successful measurement is given to the signal transmitter 115, 116 via the microchip. The linear formulas for the tightening torque and the loosening torque of the spoke nipple each contain, in addition to these parameters, the spoke tension, the thread pitch, the flank radius, and also the friction between the spoke and nipple thread. Because the same thread friction occurs for both tightening and loosening of the nipple, this can be eliminated by solving both equations. Thus the second unknown in both equations can be solved, and the spoke tension can be calculated directly without additional linearization in the microchip 119. The spoke tension can be displayed on the display 114. To supply power and set up the current loop, the cover device 113 is provided with a DC battery 122 and is also connected on its bottom side to the rotary cap top side via a permanent sliding contact 123. The rotary head 109 installed with bearing play relative to the base body conducts the current to the sliding contact 121 via one of the two pressure sensors 107 for pressure contact. Up to the measurement of the torque with the manually contacted pressure sensors 107, the screwing process is similar to that already described for the motor-driven nipple screwing measurement. In addition to the pressure sensors 107 described herein, the manual nipple wrench 102 can also be utilized with other electronic devices suitable for measuring torque.

The centering stand advantageously reduces work procedure and measurement errors occurring due to the adjustment work of measurement devices. For example arbitrary running wheel or rim sizes from 24-29 inches with hub installation widths of $\geq 90$ mm to $\leq 160$ mm are positioned for the axial and radial runout measurement of the rim measurement simultaneously in a radial plane of the running wheel and centered relative to the running wheel axis center plane. Positioning the measurement body and attachment of the measurement tracing pin may be performed in a single mechanically guided movement sequence. Due to the modular construction, the centering stand is provided with devices for installing the motor-driven nipple wrench, a motor-controlled drive roller, and also opto-electronic distance sensors.

An advantage of the measurement body is the simultaneous attachment of the two side tracing pins. Radial and axial runout measurements are possible for grooved rim sides using the side tracing pins. Increased measurement accuracy is provided through direct measurement value display without intermediate mechanical elements. Simultaneous read-out of the radial and axial runout relative to the running wheel axis center plane on a scale field. Measurement accuracy of about 0.05 mm is possible without additional equipment, using a magnifying glass over the scale field. Detecting of measurement affects due to unevenness of the rim surfaces is possible due to the reduction/enlargement of the measurement gap of the parallel measurement plates displayed relative to the running wheel axis center plane. Additional features, such as an electronic distance sensor, graphical display, or centering computer can be used with the measurement body due to its modularity according to the modular principle possible.

An advantage of the motor-driven nipple wrench is that the exact orientation of the tension socket in the nipple axis is obtained by exact-fit positioning over the spoke nipple through movement of the sliding guide body of the nipple wrench. This results in minimal mechanical wear and small overall size. Accurate positioning of the spoke nipple is obtained due to slower nipple movements measured directly via the position of the drive pinion. Exact fatigue-free work is obtained in high spoke tension ranges. Direct measurement of the spoke tension without additional equipment is another advantage. Use of a geared motor wrench socket CPU small display combination as a handheld device for exact tightening/loosening of the spoke nipple or measuring of the spoke tension with simultaneous torsion control is provided. The motor driven nipple wrench prevents measurement errors occurring during spoke tension measurement due to crossed spokes and the selection of the spoke measurement point. Spoke tension of the running wheel can be pre-selected arbitrarily through high nipple wrench operation accuracy using the microcontroller. There is low technical expense for rotational and translational movement sequence. The motor-driven nipple wrench can be adapted for use with other devices, due to its small overall size.

An advantage of the manual nipple wrench is the unification of the following processing steps previously performed separately into one work device:
a) measuring the tension of the running wheel spokes
b) torsion control of the spoke during the nipple rotation
c) manual turning of the spoke nipple.
This results in an associated time and cost savings, and increased measurement accuracy by preventing previously unavoidable error sources, e.g., due to crossed spokes and the selection of the spoke measurement point.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. An apparatus for centering and adjusting a tension of a spoked running wheel having a rim and a plurality of spokes, the apparatus comprising:
   a support device for clamping the running wheel in a position that is centered relative to a radial center plane, wherein the support device includes symmetrically arranged support plates that exert a pulling-tilting movement on the rim to center the rim relative to the running wheel axis center plane;
   a measurement device slidingly disposed on a guide portion of one of the support plates for measuring an axial and radial runout of the rim by sensing a gap size of a rim width centered relative to the running wheel radial plane;
   a nipple wrench including a support unit for adjusting the tension of the spoke running wheel; and
   an attachment device for securing the nipple wrench onto a nipple portion of the spoke, wherein the attachment device includes a sliding guide device that is placed over the spoke nipple to adjust a tension of the spoked running wheel by adjusting a position of the spoke nipple.

2. The apparatus of claim 1 wherein the support device for clamping the running wheel is installed symmetric to a running wheel axis radial center plane.

3. The apparatus of claim 1 wherein the measurement device includes measurement tracing pins that are positioned on each side of a radial segment of the rim and sense the gap size of the rim width centered relative to the running wheel radial plane.

4. The apparatus of claim 1 wherein the measurement device includes an electronic distance sensor disposed on the guide portion of one of support plates for measuring a gap size.

5. The apparatus of claim 1 wherein the nipple wrench support unit includes a holding device having a holding support for holding the running wheel axle and for clamping the hub sockets with radial slide bearings positioned parallel to the running wheel axis radial center plane.

6. The apparatus of claim 5 wherein the holding support includes the sliding guide device comprising a running wheel axis sliding guide device associated with the measurement device.

7. The apparatus of claim 6 wherein fine measurement device is installed so that it can move parallel to the framing wheel axis radial center plane in the radial direction of the running wheel.

8. The apparatus of claim 1 wherein the measurement device includes a display identifying running wheel rim defects and radial or axial deviations of running wheel rim.

9. The apparatus of claim 1 wherein file measurement device includes an opto-electronic device for transmitting and receiving flat beams running symmetrical and orthogonal to the framing wheel axis center plane and that intersect in a predetermined rim segment to measure the gap size without physical contact of file rim.

10. The apparatus of claim 9 further comprising a motor-driven device that displaces the flat beam measurement device along the guide portion of the support device to automatically adjust the measurement body corresponding to a size of the rim.

11. The apparatus of claim 1 wherein the nipple wrench comprises a motor-driven nipple wrench wherein the sliding guide device is displaceable along the spoke axis, the sliding guide device having a slotted socket that is disposed over the spoke nipple and that is rotatable over a predetermined rotational angle.

12. The apparatus of claim 11, wherein the sliding guide device includes:
   two parallel guides that open tapering outwardly in the running wheel spoke direction; and
   a holding support device for axis-parallel contact on the running wheel spoke.

13. The apparatus of claim 11 wherein the attachment device further includes at least a radial joint device that moves parallel or perpendicular or orthogonal to the running wheel radial plane using the sliding guide device.

14. The apparatus of claim 13 wherein the motor-driven nipple wrench is mounted so that it can move in the plane orthogonal to the running wheel radial plane using the linear sliding device.

15. The apparatus of claim 13 wherein the motor-driven nipple wrench is installed in the plane orthogonal to the running wheel radial plane with radial joint devices moving parallel to the running wheel radial plane.

16. The apparatus of claim 13 wherein the motor-driven nipple wrench is installed in the plane orthogonal to the running wheel radial plane with radial joint devices moving perpendicular to the running wheel radial plane.

17. The apparatus of claim 11 wherein the motor-driven nipple wrench includes a translational movement device for attaching the nipple wrench to the spoke nipple.

18. The apparatus of claim 11 wherein the motor-driven nipple wrench includes a torsion measurement device having:
   a spring-guided ball disposed on the spoke;
   an angle transmitter adjacent the spoke for measuring rotational movement of the spoke; and
   a nipple position sensor disposed on file spring-guided ball, wherein spoke tension is determinable using the angular position of the spoke and the nipple position.

19. The apparatus of claim 18 wherein a rotating wrench socket having a shape corresponding to a nipple square is attached to the nipple square, and a rotational angle measurement means is attached to a tensioning socket attached to the spoke nipple square in the spoke axial direction.

20. The apparatus of claim 1 wherein the nipple wrench comprises a manual wrench for measuring the axial tension of the spoke which includes a spoke adhesion device that can be fixed relative to one of the spokes, or one of the rims.

21. The apparatus of claim 20 wherein the manual nipple wrench for measuring the axial tension of the spoke is installed with an angled contact device that can be fixed relative to one of the rims.

22. The apparatus of claim 1 wherein the axial runout and the radial runout of the running wheel rim is displayed in a scale field using the support device arranged axis-symmetrical to the running wheel axis center plane and to two measurement tracing pins and coupled movably with the two measurement tracing pins and that the support device can be adjusted in the running wheel radial direction centered relative to the appropriate rim width and movements of the lateral measurement tracing pin acting in the same direction can be displayed as axial deviations from an ideal line.

23. The apparatus of claim 1 wherein a lateral measurement tracing pin can be coupled via the measurement body to a radial measurement tracing pin device movable in the running wheel axial direction, for groove-free rim side surfaces, both the support device coupled with the lateral and radial measurement tracing pins and also the two parallel display measurement plates can display the radial deviations of the rim together with its axial deviations.

* * * * *